No. 736,283. PATENTED AUG. 11, 1903.
R. E. MANLEY.
SOLDERING IRON.
APPLICATION FILED FEB. 17, 1903.
NO MODEL.
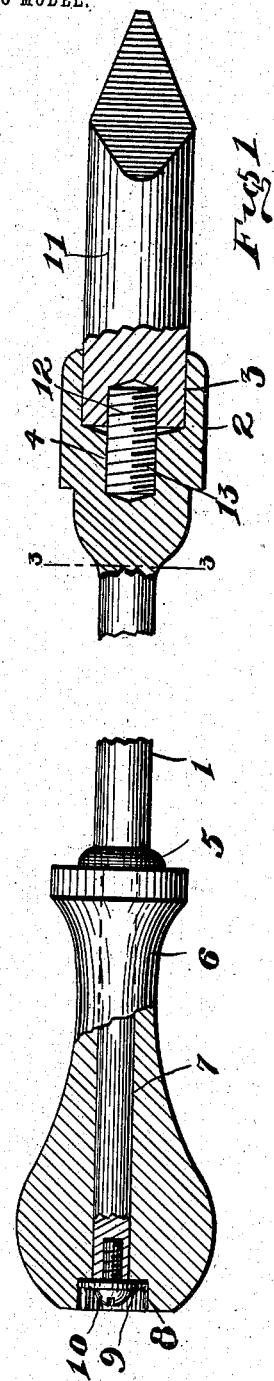
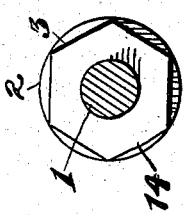
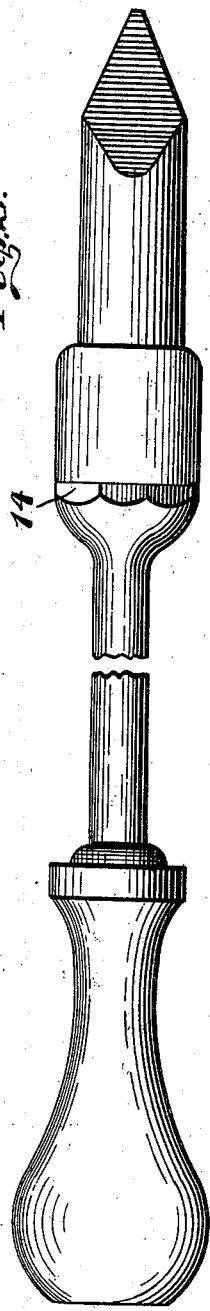
Witnesses
Berlin G. Brown.
Robert E. Manley, Inventor
By Hensey & Gaugh
Attorneys No. 736,283. Patented August 11, 1903.

UNITED STATES PATENT OFFICE.

ROBERT E. MANLEY, OF MEDIA, PENNSYLVANIA.

SOLDERING-IRON.

SPECIFICATION forming part of Letters Patent No. 736,283, dated August 11, 1903.

Application filed February 17, 1903. Serial No. 143,769. (No model.)

*To all whom it may concern:*

Be it known that I, ROBERT E. MANLEY, a citizen of the United States, residing at Media, in the county of Delaware and State of Pennsylvania, have invented certain new and useful Improvements in Soldering-Irons, of which the following is a specification, reference being had therein to the accompanying drawings.

This invention has relation to soldering-irons; and it consists in the novel construction and arrangement of the parts, as hereinafter described.

The object of the invention is to provide a soldering-iron having a separable or removable soldering-point and provided with a simple and effective means for securing the point to the holder and a means for securing the handle to the body portion of the implement in such a manner as to prevent the said handle from revolving and at the same time providing a means whereby the handle may be easily and quickly removed and another substituted in its stead.

In the accompanying drawings, Figure 1 is a side elevation of the soldering-iron with parts broken away and parts shown in section. Fig. 2 is a side elevation of the soldering-iron with parts broken away. Fig. 3 is a sectional view of the soldering-iron cut on the line 3 3 of Fig. 1.

The iron consists of the body portion 1, having at one end the enlarged head 2, in which is cut a circular recess 3. In the bottom and center of said recess 3 is cut an internally-threaded recess 4 of less diameter than the recess 3. Near the opposite end the body portion 1 is provided with a shoulder 5, against which is adapted to bear one end of the handle 6, said handle 6 having passing along its central longitudinal axis a perforation 7, adapted to receive the outer end of the body portion 1. The extreme outer end of the handle 6 is provided with the enlarged recess 8, which is adapted to receive the washer 9, and the outer end of the body portion 1 is provided with an internally-threaded recess adapted to receive the screw 10, which passes through the washer 9. The inner face of the said washer bearing against the bottom of the recess 8 forces the inner end of the handle 6 against the shoulder 5 and prevents said handle from revolving around the body portion 1. By removing the screw 10 and the washer 9 the handle 6 may be slipped off the body portion 1 and a new handle may be substituted in its stead. The soldering-point 11 is provided at its inner end with an internally-threaded recess 12. The inner end of the said point 11 is adapted to fit snugly in the recess 3 of the head 2, and the recess 12 is adapted to register with the recess 4. The externally-threaded stud 13 engages the threaded recesses 4 and 12 in a manner as shown in Fig. 1 and firmly holds the parts together. The base of the head 2 may or may not be provided with the flat faces 14, which (if adopted) may be placed in a wrench or vise for holding the body portion while the parts are being assembled or separated.

Having described my invention, what I claim as new, and desire to secure by Letters Patent, is—

1. An implement consisting of a body portion, an imperforated head fixed to said body portion, said head having a recess with an internally-threaded recess located in the bottom thereof, a removable part adapted to fit snugly at one end within said recess and having in its end an internally-threaded recess adapted to register with the threaded recess in the head, an externally-threaded stud adapted to enter and engage the registering threaded recesses of the head and the removable part and hold the parts together.

2. An implement consisting of a body portion, an imperforated head fixed to said body portion, said head having a recess of smooth bore with an internally-threaded recess located in the bottom thereof, a removable part adapted to fit snugly at one end within said recess and having in its end an internally-threaded recess adapted to register with the threaded recess in the head, an externally-threaded stud adapted to enter and engage the registering threaded recesses of the head and the removable part and hold the parts together.

In testimony whereof I affix my signature in the presence of two witnesses.

ROBERT E. MANLEY.

Witnesses:
F. W. TODD,
H. F. GARDNER.